Patented July 3, 1934

1,964,979

UNITED STATES PATENT OFFICE 1,964,979

COLORED RUBBER PRODUCT

Heinz Eichwede, Frankfort-on-the-Main-Hochst, Germany, assignor to General Aniline Works, Inc., New York, N. Y., a corporation of Delaware No Drawing. Application August 14, 1933, Serial No. 685,151. In Germany August 17, 1932

5 Claims. (Cl. 18—50)

The present invention relates to colored rubber products.

I have found that rubber products (which term is meant to include natural rubber as well as the synthetic products which have a constitution and properties similar to those of natural rubber, as for example polymerization products of butadiene hydrocarbons such as butadiene or isoprene) can be colored in blue shades having very good fastness properties by incorporating with the rubber products or mixtures containing them, prior to vulcanization, water-insoluble azo-dyestuffs of the general formula:

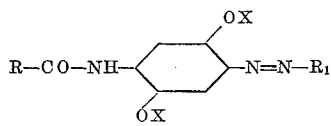

wherein R means a radical of the benzene series, $R_1$ the radical of an arylamide of 2.3-hydroxynaphthoic acid and X stands for alkyl.

By reason of the said dyestuffs being practically insoluble in rubber, they do not bleed when the rubber products are worked up; neither do they give rise to that phenomenon which is known as blushing or efflorescence when the rubber articles are stored. Furthermore, they are insoluble in benzine which renders them especially suitable also for being used in connection with cold vulcanization processes which are advantageously carried out in the presence of benzine.

The following examples will further illustrate the nature of this invention, but the invention is not restricted to these examples. The parts are by weight:

(1) A rubber mixture is prepared from 100 parts of crepe rubber, 1 part of stearic acid, 2.6 parts of sulfur, 5 parts of zinc white, 1 part of mercapto-benzothiazol, 0.2 part of hexamethylenetetramine, 60 parts of calcium carbonate, 0.6 part of ozocerite, 10 parts of lithopone, 5 parts of titanium dioxide and 2 parts of the azo-dyestuff obtainable by coupling diazotized 1-amino-4-benzoylamino-2.5-diethoxybenzene with 2.3-hydroxy-naphthoic acid-ortho-toluidide. The mixture is vulcanized in a vulcanization press for 12 minutes at a steam pressure of 3 atmospheres above atmospheric pressure. There is obtained a clear blue vulcanizate.

(2) A rubber mixture is prepared in the usual manner from crepe rubber, the usual admixtures and 2 parts of the azo dyestuff obtainable by coupling diazotized 1-amino-4-benzoylamino-2.5-dimethoxybenzene with 2.3-hydroxynaphthoic acid-parachloranilide. The mixture is vulcanized by immersing it for 8 seconds in a solution of 3 parts of sulfur chloride in 97 parts of benzine. The cold vulcanizate thus obtained has a reddish-blue color.

(3) A mixture is prepared from 100 parts of crepe rubber, 2.8 parts of sulfur, 0.4 part of paraffin oil, 3 parts of stearic acid, 2 parts of brown coal tar oil, 2 parts of colophony, 60 parts of calcium carbonate, 13.5 parts of zinc white, 4 parts of magnesium oxide, 6 parts of caolin, 0.4 part of thiuram and 2 parts of the azo-dyestuff obtainable by coupling diazotized 1-amino-4-benzoylamino-2.5-diethoxybenzene with 2.3-hydroxynaphthoic acid-ortho-phenetidide. The mixture is vulcanized for 45 minutes in hot air at 120° C. and in this way a blue vulcanizate is obtained.

(4) A mixture is prepared from 100 parts of crepe rubber 2.5 parts of sulfur, 0.35 part of thiuram, 5 parts of zinc white, 0.6 part of ozocerite, 0.5 part of stearic acid and 2 parts of the azo-dyestuff obtainable by coupling diazotized 1-amino-4-benzoylamino-2.5-dimethoxybenzene with 2.3-hydroxy-naphthoic acid-1-amino-2-methyl-4-methoxybenzene. The mass is vulcanized in an iron mould in a vulcanization press for 15 minutes at a superatmospheric pressure of 2 atmospheres. A blue vulvanizate is thus obtained.

Similar results are obtained by using instead of the dyestuffs referred to in the foregoing examples dyestuffs which contain as combining components other arylamides of 2.3-hydroxy-naphthoic acid as, for instance, the anilide, the ortho- or para-anisidide, the alpha- or beta-naphthalide, 5-chloro-2-toluidide or the like.

I claim:

1. The process of producing colored rubber products which comprises mixing a rubber product with a water-insoluble azo-dyestuff corresponding to the following general formula:

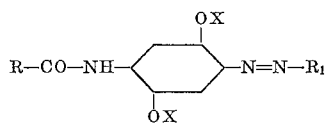

wherein R means a radical of the benzene series, $R_1$ the radical of an arylamide of 2.3-hydroxynaphthoic acid and X stands for alkyl, and then vulcanizing the mixture.

2. Colored rubber products containing a water-insoluble azo-dyestuff of the following general formula:

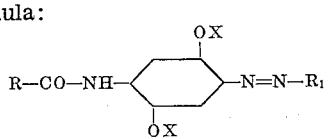

wherein R means a radical of the benzene series, R₁ the radical of an arylamide of 2.3-hydroxynaphthoic acid and X stands for alkyl.

3. Colored rubber products containing a water-insoluble azo-dyestuff of the following general formula:

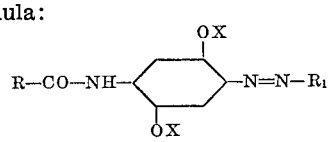

wherein R means a radical of the benzene series, R₁ the radical of an amide of 2.3-hydroxynaphthoic acid substituted in the amino group by a radical of the benzene series and X stands for alkyl.

4. Colored rubber products containing a water-insoluble azo-dyestuff derived from 1-amino-4-benzoylamino-2.5-dimethoxybenzene and a 2.3-hydroxynaphthoic acid amide substituted in the amino group by a radical of the benzene series.

5. Colored rubber products containing a water-insoluble azo-dyestuff derived from 1-amino-4-benzoylamino-2.5-dimethoxybenzene and 2.3-hydroxynaphthoic acid-ortho-toluidide.

HEINZ EICHWEDE.